(12) United States Patent
Gunjal et al.

(10) Patent No.: US 9,942,087 B2
(45) Date of Patent: Apr. 10, 2018

(54) APPLICATION RESILIENCY USING APIS

(71) Applicant: INTERNATIONAL BUSINESS MACHINES CORPORATION, Armonk, NY (US)

(72) Inventors: Richard D. Gunjal, Bangalore (IN); Dilip V. Hardikar, Pune (IN); Baiju D. Mandalia, Boca Raton, FL (US); Madhusudan Ramakrishna, Bangalore (IN); Joseph D. Robinson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 15/171,153

(22) Filed: Jun. 2, 2016

(65) Prior Publication Data
US 2017/0353348 A1    Dec. 7, 2017

(51) Int. Cl.
*G06F 15/173*    (2006.01)
*H04L 12/24*    (2006.01)

(52) U.S. Cl.
CPC ...... *H04L 41/0668* (2013.01); *H04L 41/5009* (2013.01)

(58) Field of Classification Search
CPC ...... H04L 69/04; H04L 67/04; H04L 41/0668
See application file for complete search history.

(56) References Cited

U.S. PATENT DOCUMENTS

| | | | | |
|---|---|---|---|---|
| 6,453,337 B2* | 9/2002 | Miller | ................. | G06Q 10/107 709/202 |
| 6,510,466 B1* | 1/2003 | Cox | ...................... | G06F 9/4443 709/223 |
| 6,629,133 B1* | 9/2003 | Philyaw | .................... | A63H 3/28 446/142 |
| 2001/0025300 A1* | 9/2001 | Miller | ................. | G06Q 10/107 709/206 |
| 2002/0032763 A1* | 3/2002 | Cox | ...................... | G06F 9/4443 709/223 |
| 2003/0009528 A1* | 1/2003 | Sharif | ..................... | H04L 67/06 709/206 |
| 2003/0028605 A1* | 2/2003 | Millett | ............. | G06F 17/30861 709/206 |
| 2003/0028607 A1* | 2/2003 | Miller | ................. | G06Q 10/107 709/206 |

(Continued)

*Primary Examiner* — Ranodhi Serrao
(74) *Attorney, Agent, or Firm* — Schmeiser, Olsen & Watts; John Pivnichny

(57) ABSTRACT

An approach is provided for managing resiliency of an application. Based on information specifying services provided by service providers (SPs) which is stored in a configuration management database, a topology mapping a first service provided by a first SP to a second service provided by a second SP is generated. Each of the first and second services provides a functionality of the application. A fail condition of the first SP is detected. Based on the topology, a first API provided by the first SP is determined to have provided the first service prior to the fail condition, and a second API provided by the second SP is determined to provide the second service. The first API provided by the first SP is disabled and the second API is activated, thereby continuing to provide the functionality of the application even though the first SP is experiencing the fail condition.

19 Claims, 9 Drawing Sheets

(56) References Cited

U.S. PATENT DOCUMENTS

| | | | |
|---|---|---|---|
| 2003/0126245 A1* | 7/2003 | Feltin | G06O 30/08 709/223 |
| 2004/0054719 A1* | 3/2004 | Daigle | G06Q 10/107 709/203 |
| 2008/0298459 A1* | 12/2008 | Yang | H03M 7/30 375/240 |
| 2011/0131335 A1 | 6/2011 | Spaltro et al. | |
| 2012/0069131 A1* | 3/2012 | Abelow | G06Q 10/067 348/14.01 |
| 2013/0297800 A1 | 11/2013 | Considine et al. | |
| 2014/0115161 A1 | 4/2014 | Agarwal et al. | |
| 2014/0344395 A1 | 11/2014 | Alexander | |
| 2015/0381435 A1 | 12/2015 | Todd et al. | |
| 2016/0085643 A1* | 3/2016 | McAlister | G06F 11/1435 714/4.12 |
| 2016/0086108 A1* | 3/2016 | Abelow | G06Q 10/067 705/7.29 |
| 2017/0109245 A1* | 4/2017 | McAlister | G06F 11/1435 |

* cited by examiner

300 ↘

302

| Access Mechanism | Cloud Service Provider 1 | Cloud Service Provider 2 | Cloud Service Provider 3 |
|---|---|---|---|
| Deploy VM | Rule 304 | Rule 306 | Rule 308 |
| Configure VM | | | |
| Deploy Network | | | |
| Configure Network | | | |
| Deploy Middleware | | | |
| Configure Middleware | | | |
| Deploy Application | | | |
| Configure Application | | | |

APPLICATION RESILIENCY USING APIS

BACKGROUND

The present invention relates to managing applications, and more particularly to managing resiliency of an application that initially uses services provided by a service provider, where resiliency is improved by redeploying the services to a second service provider in response to the first service provider experiencing an outage.

In many cases, an organization builds an information technology solution using the services provided by various service providers (SPs). The solution may be a cloud-based solution provided by various cloud service providers (CSPs). For example, one component of the solution resides on a cloud provided by CSP 1 while another component resides on another cloud provided by CSP 2. Because of the prohibitive cost, the organization does not have a hot or cold disaster recovery site, which leads to a significant amount of time needed to restore service for the solution.

SUMMARY

In a first embodiment, the present invention provides a method of managing resiliency of an application provided by a first service provider (SP). The method includes a computer receiving information specifying services which are provided by respective SPs including the first SP. The received information indicates that each of the services provides a functionality of the application. The method further includes the computer storing the received information in a configuration management database (CMDB). The method further includes based on the information stored in the CMDB, the computer generating a topology which maps the first SP to a second SP included in the SPs and maps a first service provided by the first SP to a second service provided by the second SP. The first and second services are included in the services specified by the received information. The method further includes subsequent to the step of generating the topology, the computer detecting a fail condition of the first SP, which indicates an outage of the first service provided by the first SP. The method further includes in response to the step of detecting the fail condition and based on the topology, the computer determining that a first API provided by the first SP had provided the first service prior to the fail condition and that a second API provided by the second SP provides the second service. The method further includes based on the first API having provided the first service and the second API providing the second service, the computer disabling the first API provided by the first SP and activating the second API provided by the second SP, so that the functionality of the application that had been provided by the first service prior to the fail condition being detected continues by being provided by the second API even though the first SP is experiencing the fail condition.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of managing resiliency of an application provided by a first service provider (SP). The method includes a computer system receiving information specifying services which are provided by respective SPs including the first SP. The received information indicates that each of the services provides a functionality of the application. The method further includes the computer system storing the received information in a configuration management database (CMIDB). The method further includes based on the information stored in the CMIDB, the computer system generating a topology which maps the first SP to a second SP included in the SPs and maps a first service provided by the first SP to a second service provided by the second SP. The first and second services are included in the services specified by the received information. The method further includes subsequent to the step of generating the topology, the computer system detecting a fail condition of the first SP, which indicates an outage of the first service provided by the first SP. The method further includes in response to the step of detecting the fail condition and based on the topology, the computer system determining that a first API provided by the first SP had provided the first service prior to the fail condition and that a second API provided by the second SP provides the second service. The method further includes based on the first API having provided the first service and the second API providing the second service, the computer system disabling the first API provided by the first SP and activating the second API provided by the second SP, so that the functionality of the application that had been provided by the first service prior to the fail condition being detected continues by being provided by the second API even though the first SP is experiencing the fail condition.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of managing resiliency of an application provided by a first service provider (SP). The method includes a computer system receiving information specifying services which are provided by respective SPs including the first SP. The received information indicates that each of the services provides a functionality of the application. The method further includes the computer system storing the received information in a configuration management database (CMDB). The method further includes based on the information stored in the CMDB, the computer system generating a topology which maps the first SP to a second SP included in the SPs and maps a first service provided by the first SP to a second service provided by the second SP. The first and second services are included in the services specified by the received information. The method further includes subsequent to the step of generating the topology, the computer system detecting a fail condition of the first SP, which indicates an outage of the first service provided by the first SP. The method further includes in response to the step of detecting the fail condition and based on the topology, the computer system determining that a first API provided by the first SP had provided the first service prior to the fail condition and that a second API provided by the second SP provides the second service. The method further includes based on the first API having provided the first service and the second API providing the second service, the computer system disabling the first API provided by the first SP and activating the second API provided by the second SP, so that the functionality of the application that had been provided by the first service prior to the fail condition being detected continues by being provided by the second API even though the first SP is experiencing the fail condition.

DETAILED DESCRIPTION

Overview

Embodiments of the present invention provide resiliency for an application by storing in a configuration management database (CMDB) (i) an inventory of SPs that provide similar services for the application and (ii) relevant data specifying the services. In response to a service disruption at a first SP that had been servicing the application, embodiments of the present invention provide the aforementioned resiliency by determining a set of APIs that switch the application from the first SP to a second SP, where the APIs are determined based on information stored in the CMDB. The switch to the second SP ensures the functionality of the application is provided even though the first SP is experiencing the service disruption. In one embodiment, the aforementioned SPs are cloud service providers (CSPs).

The use of the CMDB to determine the set of the APIs that allow a dynamic movement of an application from one SP to another SP (1) provide resiliency for small to medium sized businesses that use a computing environment in which access to standardized resources owned and managed by a SP is permitted to subscribers on a pay-per-use basis (e.g., a public cloud), (2) manage and customize the computing environment (e.g., cloud environment) to meet the needs of individual businesses, (3) enable a business application to efficiently move from one SP to another SP (e.g., from one CSP to another CSP), and (4) facilitate business continuity within a computing environment (e.g., cloud environment) or enable optimal recovery from a service outage.

System for Providing Application Resiliency

Figure 1:
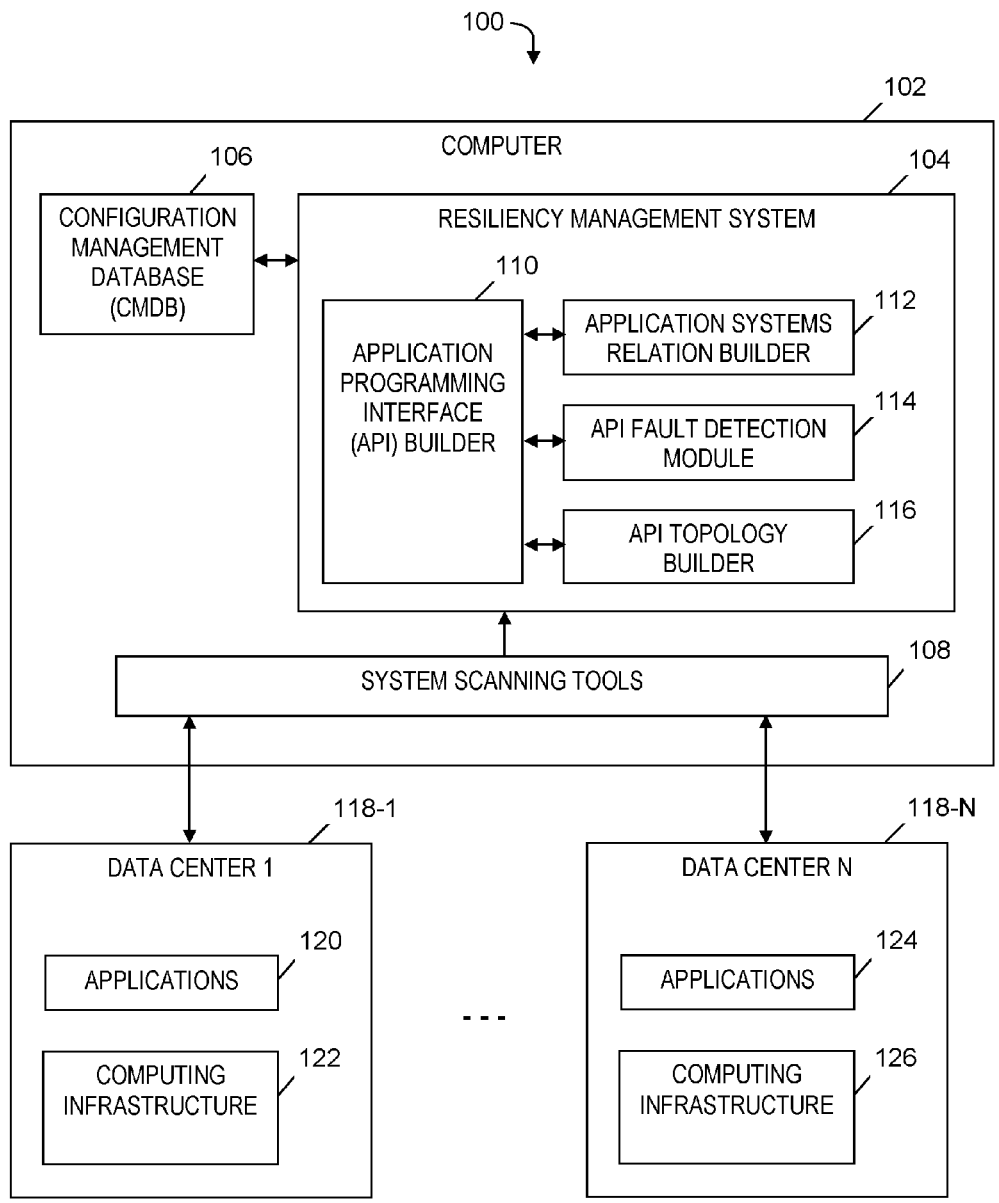
FIG. 1 is a block diagram of a system for providing resiliency to an application, in accordance with embodiments of the present invention.

FIG. 1 is a block diagram of a system 100 for providing resiliency to an application, in accordance with embodiments of the present invention. In one embodiment, system 100 provides resiliency to a cloud-based application. System 100 includes a computer 102 which includes a software-based resiliency management system 104, a configuration management database (CMDB) 106, and software-based system scanning tools 108. Resiliency management system 104 includes the following software, which is executed by computer 102: application programming interface (API) builder 110, application systems relation builder 112, API fault detection module 114, and API topology builder 116. System 100 also includes N data centers in communication with computer 102 via a network (not shown). The N data centers are data center 118-1, . . . , data center 118-N (i.e., data center 1, . . . , data center N), where N is an integer greater than one. The N data centers are managed by respective SPs. Each of the data centers in system 100 includes a respective set of applications and respective computing infrastructure. Data center 118-1 includes applications 120 and computing infrastructure 122 and data center 118-N includes applications 124 and computing infrastructure 126. In one embodiment, data centers 118-1, . . . , 118-N are N cloud data centers managed by respective CSPs and the computing infrastructure included in each of the cloud data centers is cloud computing infrastructure.

System scanning tools 108 scan data centers 118-1, . . . , 118-N to detect and receive newly created or updated APIs which provide access mechanisms to allow an application to be deployed on one of the data centers 118-1, . . . , 118-N (e.g., an application included in applications 120 being deployed on data center 118-1). System scanning tools 108 sends the APIs to as input to API builder 110. API builder 110 sends the APIs to application systems relation builder 112, which generates a relation or mapping between APIs provided by different SPs. A relation or mapping between API 1 provided by SP 1 and API 2 provided by SP 2 indicates that the functionality provided by API 1 is similar or identical to a functionality provided by API 2.

API builder 110 also sends the APIs to API fault detection module 114, which checks whether there is a match between APIs that are in a relation that was built by application systems relation builder 112. API fault detection module 114 also detects whether there is a conflict in using an API to provide a functionality of an application that is switching from a one SP to another SP (e.g., an application included in applications 120 switching from being provided by data center 118-1 to being provided by data center 118-N). API fault detection module 114 may resolve the conflict by receiving a change to the application so that the API can be used by the application being switched form one SP to another SP.

API builder 110 sends the APIs to API topology builder 116, which generates a topology that includes the relations or mappings built by application systems relation builder 112. API topology builder 116 uses the generated topology to create a recovery model that indicates how the application (e.g., an application included in applications 120) that had been deployed on a first SP (e.g., data center 118-1) will be redeployed on a second SP (e.g., data center 118-N) in response to a service outage experienced by the first SP.

In one embodiment, the recovery model includes geographic affinities associated with the APIs that are providing the same or similar application functionality. The geographic affinities in the model favor a selection of one API over another because the geographic location of the SP that provides the selected API provides an acceptable level of application latency based on a predetermined threshold, whereas the geographic location of the other SP whose API is not selected does not provide an acceptable application latency.

In one embodiment, the recovery model generated by API topology builder 116 includes application-specific re-provisioning requirements, such as a requirement for a threshold amount of bandwidth connectivity between the selected SP and a provider of the application that manages the data for the application.

In one embodiment, the aforementioned recovery model includes dependencies between the data used for the application and the API.

The functionality of the components shown in FIG. 1 is described in more detail in the discussion of FIGS. 2A-2B, FIG. 3, FIG. 4, FIG. 5, FIG. 6, and FIG. 7 presented below.

Process for Providing Application Resiliency

Figure 2A:
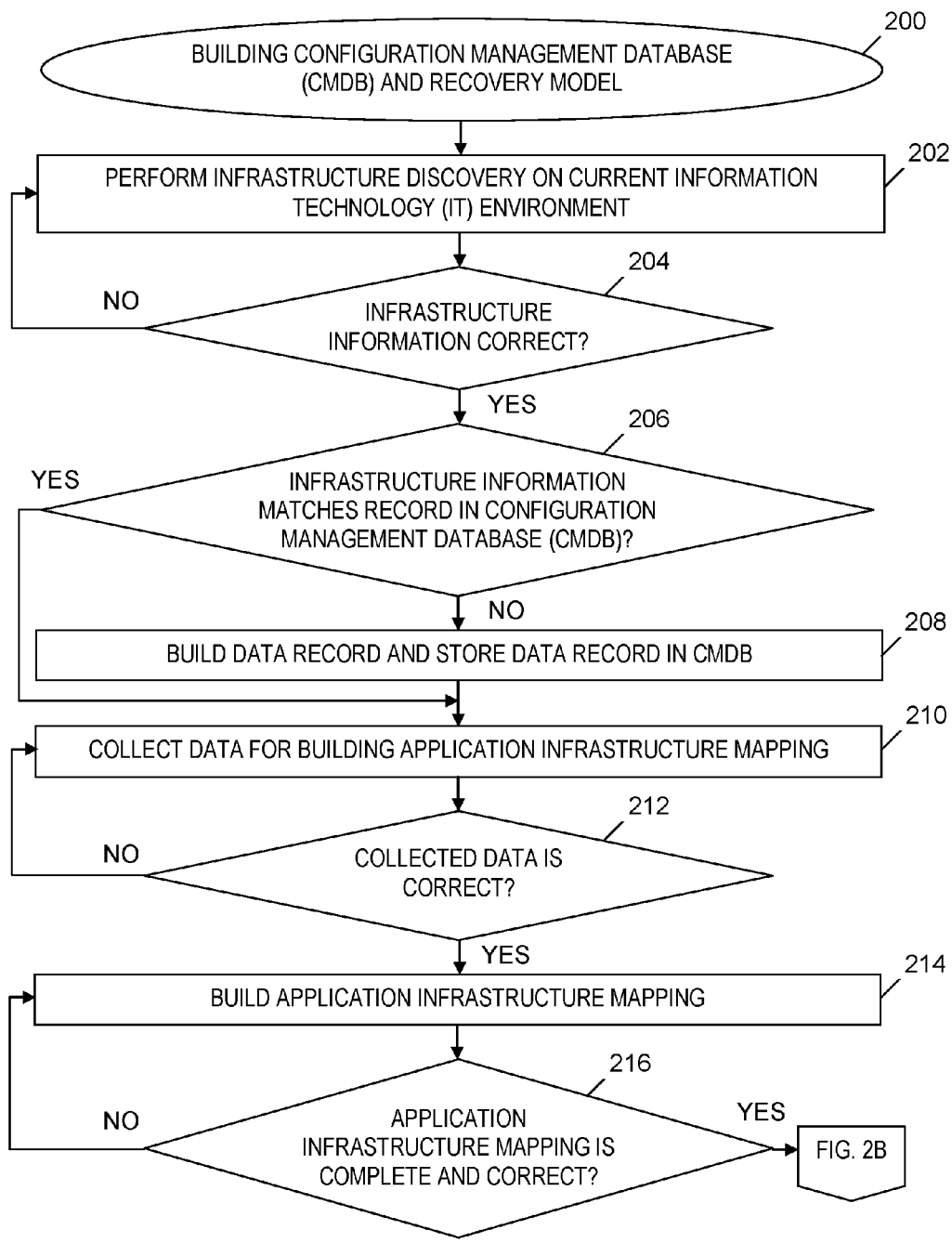
FIGS. 2A-2B depict a flowchart of a process of providing resiliency to an application, where the process is implemented in the system of FIG. 1, in accordance with embodiments of the present invention.
Figure 2B:
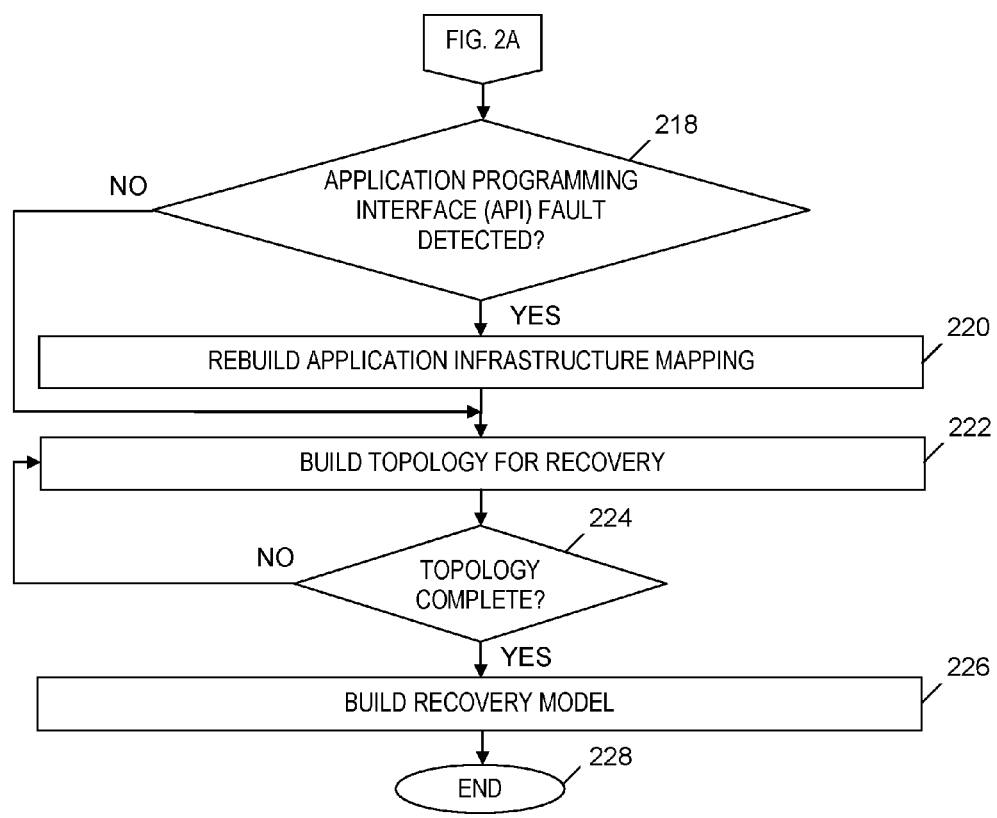

FIGS. 2A-2B depict a flowchart of a process of providing resiliency to an application, where the process is implemented in the system of FIG. 1, in accordance with embodiments of the present invention. In one embodiment, the process of FIGS. 2A-2B provides resiliency to a cloud-based application. The process of FIGS. 2A-2B starts at step 200 in FIG. 2A. In step 202, system scanning tools 108 and API builder 110 (see FIG. 1) collect infrastructure information by performing infrastructure discovery on a current information technology (IT) environment. The information collected in step 202 includes information specifying computing infrastructure 122 (see FIG. 1), computing infrastructure 126 (see FIG. 1), and other computing infrastructure components included in data centers 118-1, . . . , 118-N (see FIG. 1). The information about a computing infrastructure includes a machine serial number, an identification of the operating system, where the infrastructure is hosted, and a description of the kind of IT environment.

In another embodiment, resiliency management system 104 (see FIG. 1) receives the information about computing infrastructure from one or more spreadsheets which are updated by an administrator.

In step 204, resiliency management system 104 (see FIG. 1) determines whether the infrastructure information collected in step 202 is correct. If any of the infrastructure information collected in step 202 is determined to incorrect in step 204, then the No branch of step 204 is followed and the process loops back to step 202 in which system scanning tools 108 (see FIG. 1) re-scans the IT environment to collect infrastructure information that corrects the incorrect infrastructure information. Alternatively, the loop back to step 202 includes requesting the administrator to confirm whether the infrastructure information is correct.

If the infrastructure information collected in step 202 is determined to be correct in step 204, then the Yes branch of step 204 is followed and step 206 is performed.

In step 206, resiliency management system 104 (see FIG. 1) determines whether the infrastructure information collected in step 202 matches a record in CMDB 106 (see FIG. 1). If the infrastructure information does not match any record in CMDB 106 (see FIG. 1) (i.e., a new API is detected in the infrastructure information), then the No branch of step 206 is followed and step 208 is performed.

In step 208, resiliency management system 104 builds a data record that stores the infrastructure information that did not match any record in CMDB 106 (see FIG. 1) in step 206 and stores the newly built data record in CMDB 106.

Returning to step 206, if the infrastructure information matches a record in CMDB 106 (see FIG. 1), then the Yes branch of step 206 is followed and the process skips step 208 and performs step 210. Step 210 also follows step 208.

In step 210, API builder 110 (see FIG. 1) collects data for building an application infrastructure mapping. In one embodiment, the collected data includes an application identifier (ID), a description of the function of the application, the operating system level, and a specification of the Internet Protocol being used. The data is collected, for example, via a spreadsheet file.

In step 212, resiliency management system 104 (see FIG. 1) determines whether the data collected in step 210 is correct. If any of the data collected in step 210 is determined to be not correct in step 212, then the No branch of step 212 is followed and the process loops back to step 210 to collect updated data which is correct.

If the data collected in step 210 is determined to be correct in step 212, then the Yes branch of step 212 is followed and step 214 is performed.

In step 214, application systems relation builder 112 (see FIG. 1) builds an application infrastructure mapping which maps an API provided by a first SP to one or more APIs provided by respective one or more other SPs based on each of the one or more APIs providing identical or similar functionality as the functionality of the API provided by the first SP. For a particular infrastructure, building an application infrastructure mapping in step 214 includes (1) a top down approach from the infrastructure level (i.e., from the business application level, application systems relation builder 112 (see FIG. 1) maps all the information that is associated with the particular infrastructure) and (2) a bottom up approach from all the applications to the infrastructure. In one embodiment, application systems relation builder 112 (see FIG. 1) in step 214 builds an application infrastructure mapping which maps an API provided by a first CSP to one or more APIs provided by respective one or more other CSPs based on each of the one or more APIs providing identical or similar functionality as the functionality of the API provided by the first CSP.

In step 216, resiliency management system 104 (see FIG. 1) determines whether the application infrastructure mapping built in step 214 is complete and correct by checking data in CMDB 106 (see FIG. 1). If the application infrastructure mapping is determined in step 216 to be not complete, not correct, or both not complete and not correct, then the No branch of step 216 is followed and the process loops back to step 214 in which application systems relation builder 112 re-builds the application infrastructure mapping to make the mapping complete if the mapping had been incomplete and correct if the mapping had been incorrect. For example, the validation of the mapping in step 216 includes checking whether a lack of an identification of nodes connected to a server is correct. The lack of nodes may be correct because the server is a standalone server, or the lack of nodes may be incorrect because the server is a client server and all servers connected to the client server need to be identified in the mapping.

If the application infrastructure mapping is determined to be complete and correct in step 216, then the Yes branch of step 216 is followed and the process continues in step 218 in FIG. 2B.

In step 218, API fault detection module 114 (see FIG. 1) determines whether any faults are detected in the APIs in the application infrastructure mapping built in step 214 (see FIG. 2A). If any fault is detected in step 218, then the Yes branch of step 218 is followed and step 220 is performed.

In step 220, application systems relation builder 112 (see FIG. 1) rebuilds the application infrastructure mapping.

Returning to step 218, if no fault in the application infrastructure mapping is detected, then the No branch of step 218 is followed, step 220 is skipped and step 222 is performed. Step 222 also follows step 220, which was described above.

In step 222, API topology builder 116 (see FIG. 1) builds a topology based on the application infrastructure mapping.

The topology is a basis for a recovery model by which an application is switched from being provided by a first SP to being provided by a second SP in response to a determination that the first SP is experiencing an outage or service interruption. In one embodiment, the topology is a basis for a recover model by which an application is switched from being provided by a first CSP to being provided by a second CSP in response to a determination that the first CSP is experiencing an outage or service interruption.

In step 224, resiliency management system 104 (see FIG. 1) determines whether the topology built in step 222 is complete. If the topology built in step 222 is determined to be incomplete in step 224, then the No branch is followed and the process loops back to step 222 in which API topology builder re-checks data in CMDB 106 (see FIG. 1) and the mapping built in step 214 (see FIG. 2A) and re-builds the topology to generate a complete topology.

If the topology built in step 222 is determined in step 224 to be complete, then the Yes branch of step 224 is followed and step 226 is performed.

In step 226, API topology builder 116 (see FIG. 1) builds a recovery model (i.e., a resiliency facility) based on the topology built in step 222. API topology builder 116 (see FIG. 1) creates an API which is used for the recovery model associated with a particular SP. The recovery model specifies the particular layer of the computing environment (e.g., service layer), an identification of the SP, deployment details, operating system details, configuration network details, and the type of the application. In one embodiment, the API created by API topology builder 116 (see FIG. 1) is used for the recovery model associated with a particular CSP and the recovery model specifies the particular layer of the cloud environment, and an identification of the CSP, along with the type of application and the details of deployment, the operating system, and configuration network.

In step 228, the process of FIGS. 2A-2B ends.

Configuration Management Database

Figures 3, 4:
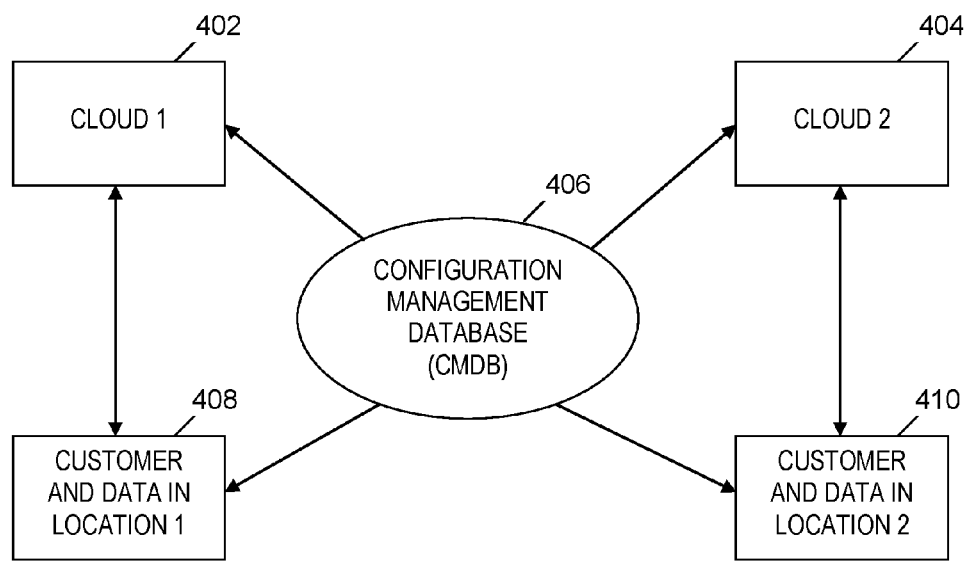
FIG. 3 depicts a table of exemplary rules in a configuration management database included in the system of FIG. 1, in accordance with embodiments of the present invention.
FIG. 4 is an example of a re-instantiation of an application to provide resiliency in the process of FIGS. 2A-2B, in accordance with embodiments of the present invention.

FIG. 3 depicts a table 300 of exemplary rules stored in a configuration management database included in the system of FIG. 1, in accordance with embodiments of the present invention. Table 300 includes access mechanisms 302, which include deploy a virtual machine (VM), configure the VM, deploy a network, configure the network, deploy middleware, configure middleware, deploy an application, and configure the application. Access mechanisms 302 specify deployment and configuration of services provided by portals of CSP 1, CSP 2, and CSP 3. During step 222 (see FIG. 2B), resiliency management system 104 (see FIG. 1) generates and stores rules 304, 306, and 308 for access mechanism "Deploy VM" for Cloud Service Provider 1, Cloud Service Provider 2, and Cloud Service Provider 3, respectively. For example, rules 304, 306, and 308 are rules stored in CMDB 106 (see FIG. 1) which specify respective APIs for deploying a VM, where the APIs are provided by respective portals of Cloud Service Provider 1, Cloud Service Provider 2, and Cloud Service Provider 3.

FIG. 4 is an example of a re-instantiation of an application to provide resiliency in the process of FIGS. 2A-2B, in accordance with embodiments of the present invention. A first cloud 402 and a second cloud 404 access CMDB 406, which is an example of CMDB 106 in FIG. 1. A customer (e.g., an application developer) using clouds 402 and 404 develops applications that can use and maintain either data 408 in a database in a first location or data 410 in another database in a second location, where data 410 is a backup of data 408. Subsequent to the applications running on cloud 402, resiliency management system 104 (see FIG. 1) detects a fail condition in cloud 402 indicating a complete cloud data center outage. In response to the detection of the fail condition, resiliency management system 104 (see FIG. 1) uses APIs included in CMDB 406 to re-instantiate the applications that had been running on cloud 402 onto cloud 404. After re-instantiating the applications, the applications running on cloud 404 use data 410.

Figure 5:
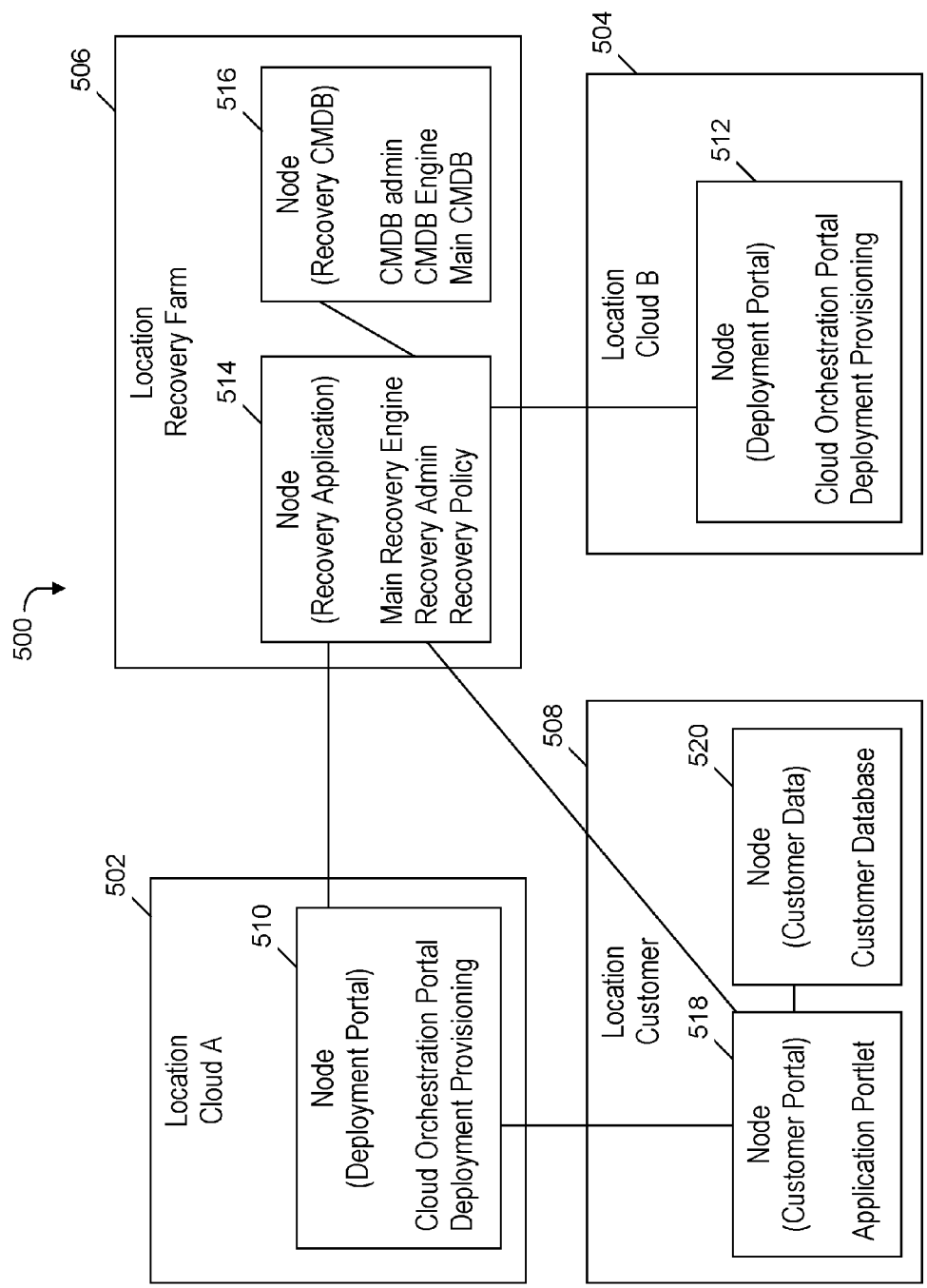
FIG. 5 is a concept model of a recovery of an exemplary application provided in the process of FIGS. 2A-2B, in accordance with embodiments of the present invention.

FIG. 5 is a concept model 500 of a recovery of an exemplary application provided in the process of FIGS. 2A-2B, in accordance with embodiments of the present invention. Concept model 500 includes locations 502, 504, 506, and 508. Location 502 is Cloud A and location 504 is Cloud B. Each cloud has a provisioning portal. Cloud A includes a node 510, which indicates a deployment portal. Similarly, Cloud B includes a node 512, which indicates a deployment portal.

Location 506 is a Recovery Farm that provides the functionality of resiliency management system 104 (see FIG. 1). The Recovery Farm includes a recovery application node 514 and a recovery CMDB node 516. Location 508 is a Customer location which includes a customer portal node 518 and a customer data node 520. Recover application node 514 includes a recovery application that manages the recovery process in terms of communication with deployment portal nodes 510 and 512. Using information from the CMDB included in recovery CMDB node 516, the Recovery Farm transfers services from Cloud A to Cloud B.

Recovery of an Application

Figure 6:
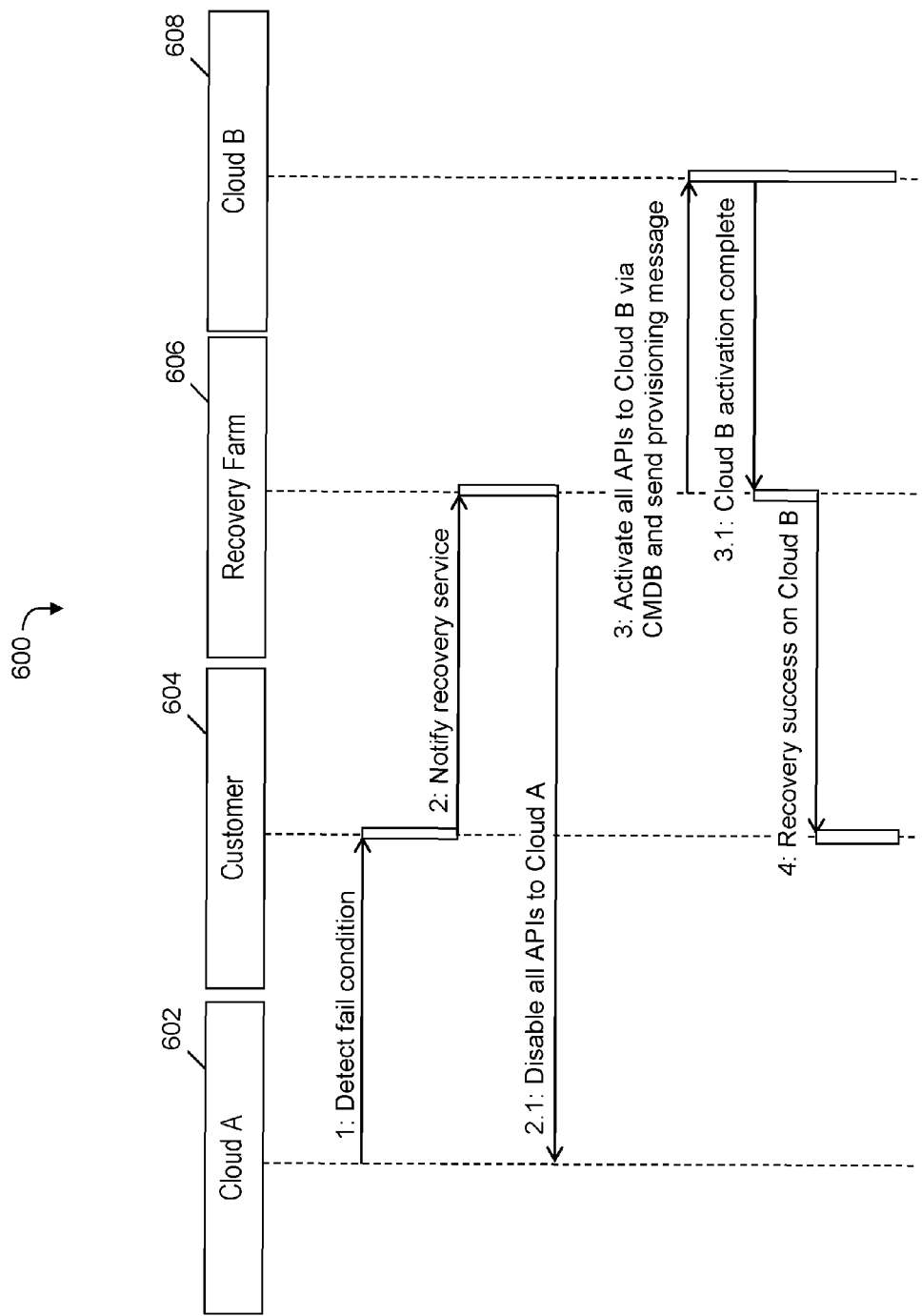
FIG. 6 is a sequence diagram of an exemplary recovery of an application provided in the process of FIGS. 2A-2B, in accordance with embodiments of the present invention.

FIG. 6 is a sequence diagram 600 of an exemplary recovery of an application provided in the process of FIGS. 2A-2B, in accordance with embodiments of the present invention. Sequence diagram 600 includes a cloud 602 (i.e., Cloud A), a customer 604, a recovery farm 606, and a cloud 608 (i.e., Cloud B). Recovery farm 606 includes the functionality of resiliency management system 104 (see FIG. 1). Customer 604 (i.e., a customer's computer system) hosts the main portal and data for the customer's service, while Cloud A and Cloud B are service providers that render the applications that service the customer data. In step 1, a customer portal of customer 604 is notified of a fail condition in Cloud A by which a recovery of the applications to a backup cloud service provider is needed. In step 2, customer 604 notifies a recovery service of recovery farm 606 about the fail condition and the need for recovery of the applications to a backup cloud. Recovery farm 606 uses CMDB 106 (see FIG. 1) to identify Cloud B as the backup cloud service provider for the applications. In step 2.1 and in response to identifying Cloud B, recovery farm 606 disables the APIs to Cloud A.

In step 3, recovery farm 606 activates the APIs to Cloud B via CMDB 106 (see FIG. 1) and sends a provisioning message to Cloud B. In step 3.1 and in response to receiving the provisioning message, Cloud B sends a message to recovery farm 606 indicating that activation of the APIs to Cloud B is complete. In step 4, recovery farm 606 notifies the customer portal of customer 604 of the success of the recovery of the applications on Cloud B.

Computer System

Figure 7:
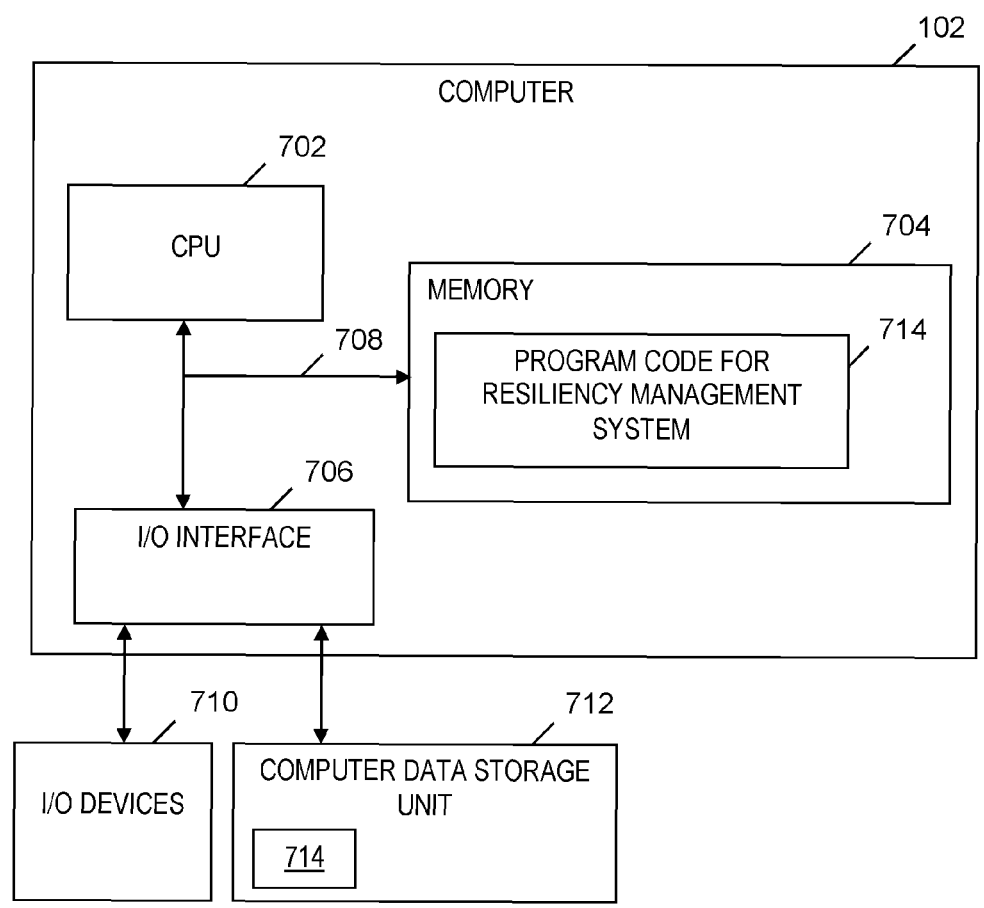
FIG. 7 is a block diagram of a computer that is included in the system of FIG. 1 and that implements the process of FIGS. 2A-2B, in accordance with embodiments of the present invention.

FIG. 7 is a block diagram of a computer 102 that is included in the system of FIG. 1 and that implements the process of FIGS. 2A-2B, in accordance with embodiments of the present invention. Computer 102 is a computer system that generally includes a central processing unit (CPU) 702, a memory 704, an input/output (I/O) interface 706, and a bus 708. Further, computer 102 is coupled to I/O devices 710 and a computer data storage unit 712. CPU 702 performs computation and control functions of computer 102, including executing instructions included in program code 714 for resiliency management system 104 (see FIG. 1) to perform a method of managing resiliency of an application, where the instructions are executed by CPU 702 via memory 704. In the discussion of FIG. 7, the application whose resiliency is managed may be a cloud-based application. CPU 702 may include a single processing unit, or be distributed across one or more processing units in one or more locations (e.g., on a client and server).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are executed. Moreover, similar to CPU 702, memory 704 may reside at a single physical location, including one or more types of data storage, or be distributed across a plurality of physical systems in various forms. Further, memory 704 can include data distributed across, for example, a local area network (LAN) or a wide area network (WAN).

I/O interface 706 includes any system for exchanging information to or from an external source. I/O devices 710 include any known type of external device, including a display device, keyboard, etc. Bus 708 provides a communication link between each of the components in computer 102, and may include any type of transmission link, including electrical, optical, wireless, etc.

I/O interface 706 also allows computer 102 to store information (e.g., data or program instructions such as program code 714) on and retrieve the information from computer data storage unit 712 or another computer data storage unit (not shown). Computer data storage unit 712 includes a known computer-readable storage medium, which is described below. In one embodiment, computer data storage unit 712 is a non-volatile data storage device, such as a magnetic disk drive (i.e., hard disk drive) or an optical disc drive (e.g., a CD-ROM drive which receives a CD-ROM disk).

Memory 704 and/or storage unit 712 may store computer program code 714 that includes instructions that are executed by CPU 702 via memory 704 to manage resiliency of an application. Although FIG. 7 depicts memory 704 as including program code, the present invention contemplates embodiments in which memory 704 does not include all of code 714 simultaneously, but instead at one time includes only a portion of code 714.

Further, memory 704 may include an operating system (not shown) and may include other systems not shown in FIG. 7.

Storage unit 712 and/or one or more other computer data storage units (not shown) that are coupled to computer 102 may store CMDB 106 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to managing resiliency of an application. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 102) including one or more processors (e.g., CPU 702), wherein the processor(s) carry out instructions contained in the code causing the computer system to manage resiliency of an application. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of managing resiliency of an application.

While it is understood that program code 714 for managing resiliency of an application may be deployed by manually loading directly in client, server and proxy computers (not shown) via loading a computer-readable storage medium (e.g., computer data storage unit 712), program code 714 may also be automatically or semi-automatically deployed into computer 102 by sending program code 714 to a central server or a group of central servers. Program code 714 is then downloaded into client computers (e.g., computer 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of managing resiliency of an application. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B and FIG. 6) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-Demand Self-Service:

a cloud consumer can unilaterally provision computing capabilities, such as server time and network storage, as needed automatically without requiring human interaction with the service's provider.

Broad Network Access:

capabilities are available over a network and accessed through standard mechanisms that promote use by heterogeneous thin or thick client platforms (e.g., mobile phones, laptops, and PDAs).

Resource Pooling:

the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid Elasticity:

capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured Service:

cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS):

the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS):

the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS):

the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private Cloud:

the cloud infrastructure is operated solely for an organization. It may be managed by the organization or a third party and may exist on-premises or off-premises.

Community Cloud:

the cloud infrastructure is shared by several organizations and supports a specific community that has shared concerns (e.g., mission, security requirements, policy, and compliance considerations). It may be managed by the organizations or a third party and may exist on-premises or off-premises.

Public Cloud:

the cloud infrastructure is made available to the general public or a large industry group and is owned by an organization selling cloud services.

Hybrid Cloud:

the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
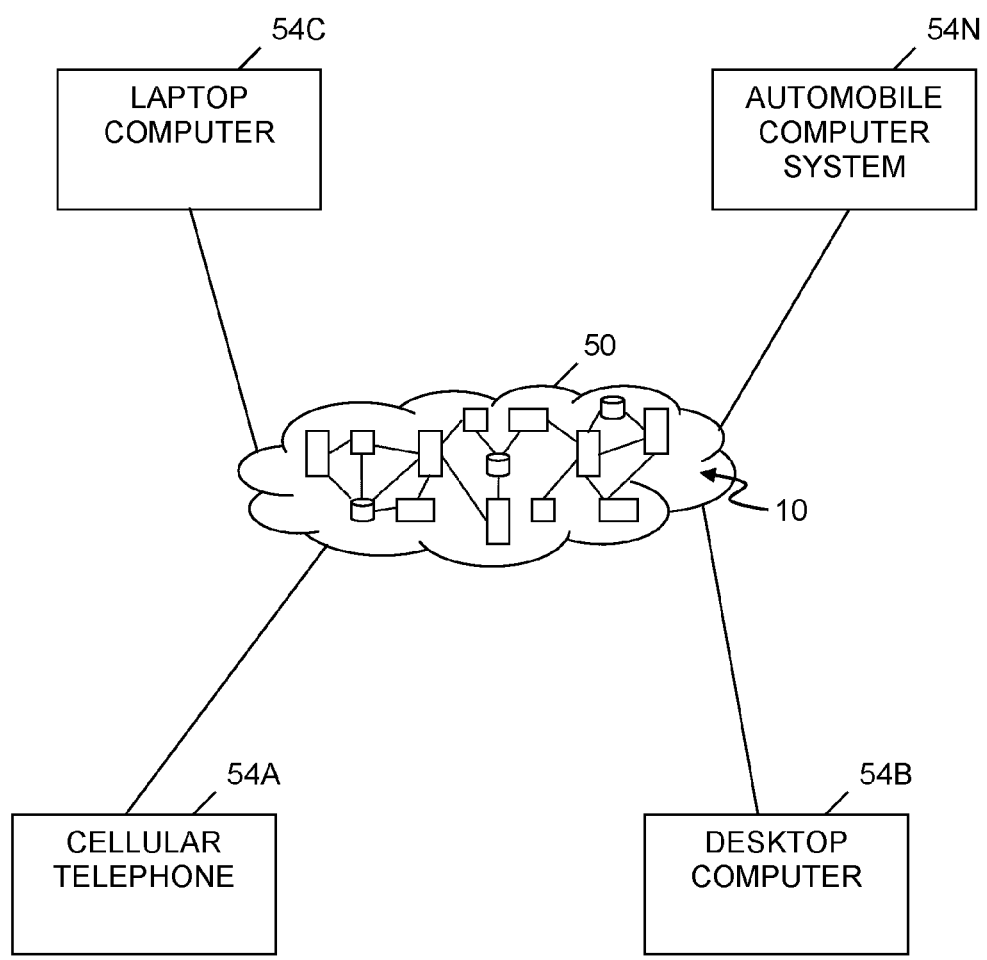
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
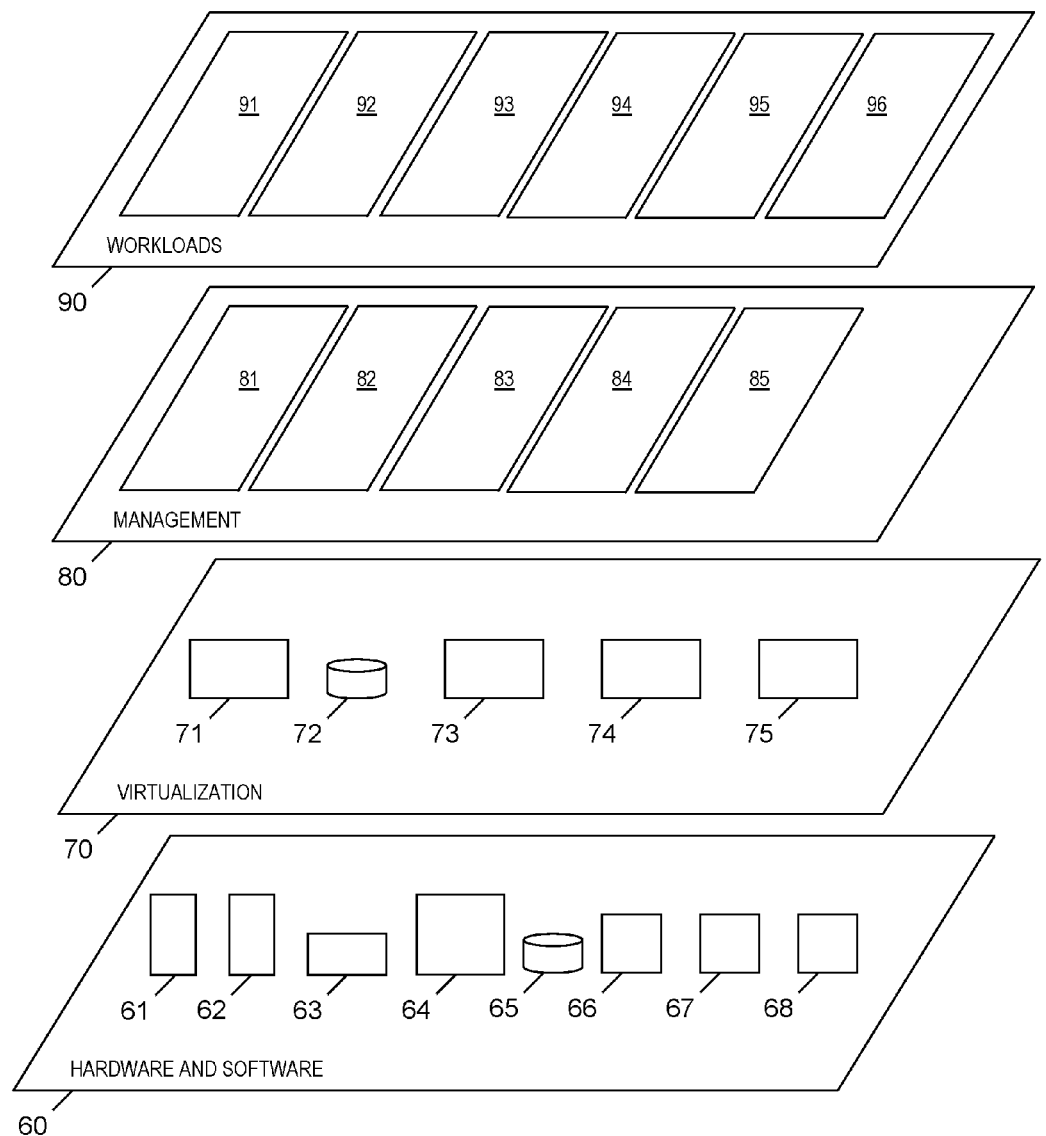
FIG. 9 depicts abstraction model layers, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimal event routing to solvers 120-1, . . . , 120-N (see FIG. 1) for event resolution 96.

What is claimed is:

1. A method of managing resiliency of an application provided by a first service provider (SP), the method comprising the steps of:
   a computer receiving information specifying services which are provided by respective SPs including the first SP, the information indicating that each of the services provides a functionality of the application;
   the computer storing the received information in a configuration management database (CMDB);
   based on the information stored in the CMDB, the computer generating a topology which maps the first SP to a second SP included in the SPs and maps a first service provided by the first SP to a second service provided by the second SP, the first and second services being included in the services specified by the received information;
   subsequent to the step of generating the topology, the computer detecting a fail condition of the first SP, which indicates an outage of the first service provided by the first SP;
   in response to the step of detecting the fail condition and based on the topology, the computer determining that a first API provided by the first SP had provided the first service prior to the fail condition and that a second API provided by the second SP provides the second service;
   based on the first API having provided the first service and the second API providing the second service, the computer disabling the first API provided by the first SP and activating the second API provided by the second SP, so that the functionality of the application that had been provided by the first service prior to the fail condition being detected continues by being provided by the second API even though the first SP is experiencing the fail condition.

2. The method of claim 1, further comprising the steps of:
   the computer receiving other information specifying the application and infrastructure components of the SPs, which are cloud service providers (CSPs); and
   the computer storing the other information specifying the application and the infrastructure components in the CMDB,
   wherein the step of generating the topology is based on the other information and infrastructure components stored in the CMDB.

3. The method of claim 1, further comprising the steps of:
   the computer receiving sets of APIs for respective portals of corresponding SPs which are corresponding cloud service providers (CSPs), each of the received sets of APIs indicating mechanisms to deploy a service on the corresponding CSP, the mechanisms including at least one of deploying a virtual machine, configuring the virtual machine, deploying a network, configuring the network, deploying middleware, configuring the middleware, deploying the application, and configuring the application;
   the computer storing the sets of APIs in the CMDB; and
   the computer generating and storing rules in the CMDB, so that each rule indicates conditions under which a corresponding set of APIs is executed to deploy the service on the corresponding CSP,
   wherein the step of generating the topology includes the step of generating and storing the rules, and
   wherein the steps of disabling the first API and activating the second API are based on the rules stored in the CMDB.

4. The method of claim 1, further comprising the steps of:
   the computer receiving sets of APIs for respective SPs which are cloud service providers (CSPs), each of the received sets of APIs indicating mechanisms to deploy a service on a corresponding CSP included in the CSPs;
   the computer generating and storing rules in the CMDB, so that each rule indicates conditions under which a corresponding set of APIs is executed to deploy the service on the corresponding CSP;
   the computer obtaining a subscription to a service that sends a notification of changes to the sets of APIs;
   based on the subscription, the computer receiving a notification of a change to a set of APIs specified by a rule stored in the CMDB; and
   in response to the step of receiving the notification, the computer updating the rule in the CMDB based on the change to the set of APIs.

5. The method of claim 1, further comprising the steps of:
   the computer receiving first, second, and third information about the first service provided by the first SP which is a first cloud service provider (CSP), the second service provided by the second SP which is a second CSP, and the a third service provided by a third SP which is a third CSP, respectively, wherein the first, second, and third information includes geographic attributes of the first, second, and third CSPs, respectively;
   the computer determining that the second and third services provide the functionality of the application;
   the computer determining a threshold for a latency of the application;

based on the geographic attributes in the second information, the computer determining that redeploying the application to the second CSP results in a first latency of the application;

based on the geographic attributes in the third information, the computer determining that redeploying the application to the third CSP results in a second latency of the application;

the computer determining that the first latency does not exceed the threshold and the second latency exceeds the threshold; and based on the second service providing the functionality of the application, the first latency not exceeding the threshold, and the second latency exceeding the threshold, the computer redeploying the application to the second CSP and not to the third CSP.

6. The method of claim 1, wherein the step of detecting the fail condition includes detecting an outage of an entire data center provided by the first SP which is a first cloud service provider (CSP), the outage of the entire data center causing the outage of the first service.

7. The method of claim 1, further comprising the step of:
providing at least one support service for at least one of creating, integrating, hosting, maintaining, and deploying computer-readable program code in the computer, the program code being executed by a processor of the computer to implement the steps of receiving the information specifying the services, storing the received information in the CMDB, generating the topology, detecting the fail condition, determining that the first API had provided the first service prior to the fail condition and that the second API provides the second service, disabling the first API, and activating the second API.

8. A computer program product, comprising:
a computer-readable storage device; and
a computer-readable program code stored in the computer-readable storage device, the computer-readable program code containing instructions that are executed by a central processing unit (CPU) of a computer system to implement a method of managing resiliency of an application provided by a first service provider (SP), the method comprising the steps of:
the computer system receiving information specifying services which are provided by respective SPs including the first SP, the information indicating that each of the services provides a functionality of the application;
the computer system storing the received information in a configuration management database (CMDB);
based on the information stored in the CMDB, the computer system generating a topology which maps the first SP to a second SP included in the SPs and maps a first service provided by the first SP to a second service provided by the second SP, the first and second services being included in the services specified by the received information;
subsequent to the step of generating the topology, the computer system detecting a fail condition of the first SP, which indicates an outage of the first service provided by the first SP;
in response to the step of detecting the fail condition and based on the topology, the computer system determining that a first API provided by the first SP had provided the first service prior to the fail condition and that a second API provided by the second SP provides the second service;
based on the first API having provided the first service and the second API providing the second service, the computer system disabling the first API provided by the first SP and activating the second API provided by the second SP, so that the functionality of the application that had been provided by the first service prior to the fail condition being detected continues by being provided by the second API even though the first SP is experiencing the fail condition.

9. The computer program product of claim 8, wherein the method further comprises the steps of:
the computer system receiving other information specifying the application and infrastructure components of the SPs which are cloud service providers (CSPs); and
the computer system storing the other information specifying the application and the infrastructure components in the CMDB,
wherein the step of generating the topology is based on the other information and infrastructure components stored in the CMDB.

10. The computer program product of claim 8, wherein the method further comprises the steps of:
the computer system receiving sets of APIs for respective portals of corresponding SPs which are corresponding cloud service providers (CSPs), each of the received sets of APIs indicating mechanisms to deploy a service on the corresponding CSP, the mechanisms including at least one of deploying a virtual machine, configuring the virtual machine, deploying a network, configuring the network, deploying middleware, configuring the middleware, deploying the application, and configuring the application;
the computer system storing the sets of APIs in the CMDB; and
the computer system generating and storing rules in the CMDB, so that each rule indicates conditions under which a corresponding set of APIs is executed to deploy the service on the corresponding CSP,
wherein the step of generating the topology includes the step of generating and storing the rules, and
wherein the steps of disabling the first API and activating the second API are based on the rules stored in the CMDB.

11. The computer program product of claim 8, wherein the method further comprises the steps of:
the computer system receiving sets of APIs for respective SPs which are cloud service providers (CSPs), each of the received sets of APIs indicating mechanisms to deploy a service on a corresponding CSP included in the CSPs;
the computer system generating and storing rules in the CMDB, so that each rule indicates conditions under which a corresponding set of APIs is executed to deploy the service on the corresponding CSP;
the computer system obtaining a subscription to a service that sends a notification of changes to the sets of APIs;
based on the subscription, the computer system receiving a notification of a change to a set of APIs specified by a rule stored in the CMDB; and
in response to the step of receiving the notification, the computer system updating the rule in the CMDB based on the change to the set of APIs.

12. The computer program product of claim 8, wherein the method further comprises the steps of:
the computer system receiving first, second, and third information about the first service provided by the first SP which is a first cloud service provider (CSP), the second service provided by the second SP which is a second CSP, and the a third service provided by a third SP which is a third CSP, respectively, wherein the first, second, and third information includes geographic attributes of the first, second, and third CSPs, respectively;

the computer system determining that the second and third services provide the functionality of the application;

the computer system determining a threshold for a latency of the application;

based on the geographic attributes in the second information, the computer system determining that redeploying the application to the second CSP results in a first latency of the application;

based on the geographic attributes in the third information, the computer system determining that redeploying the application to the third CSP results in a second latency of the application;

the computer system determining that the first latency does not exceed the threshold and the second latency exceeds the threshold; and based on the second service providing the functionality of the application, the first latency not exceeding the threshold, and the second latency exceeding the threshold, the computer system redeploying the application to the second CSP and not to the third CSP.

13. The computer program product of claim 8, wherein the step of detecting the fail condition includes detecting an outage of an entire data center provided by the first SP which is a cloud service provider, the outage of the entire data center causing the outage of the first service.

14. A computer system comprising:
a central processing unit (CPU);
a memory coupled to the CPU; and
a computer readable storage device coupled to the CPU, the storage device containing instructions that are executed by the CPU via the memory to implement a method of managing resiliency of an application provided by a first service provider (SP), the method comprising the steps of:
the computer system receiving information specifying services which are provided by respective SPs including the first SP, the information indicating that each of the services provides a functionality of the application;
the computer system storing the received information in a configuration management database (CMDB);
based on the information stored in the CMDB, the computer system generating a topology which maps the first SP to a second SP included in the SPs and maps a first service provided by the first SP to a second service provided by the second SP, the first and second services being included in the services specified by the received information;
subsequent to the step of generating the topology, the computer system detecting a fail condition of the first SP, which indicates an outage of the first service provided by the first SP;
in response to the step of detecting the fail condition and based on the topology, the computer system determining that a first API provided by the first SP had provided the first service prior to the fail condition and that a second API provided by the second SP provides the second service;
based on the first API having provided the first service and the second API providing the second service, the computer system disabling the first API provided by the first SP and activating the second API provided by the second SP, so that the functionality of the application that had been provided by the first service prior to the fail condition being detected continues by being provided by the second API even though the first SP is experiencing the fail condition.

15. The computer system of claim 14, wherein the method further comprises the steps of:
the computer system receiving other information specifying the application and infrastructure components of the SPs which are cloud service providers (CSPs); and
the computer system storing the other information specifying the application and the infrastructure components in the CMDB,
wherein the step of generating the topology is based on the other information and infrastructure components stored in the CMDB.

16. The computer system of claim 14, wherein the method further comprises the steps of:
the computer system receiving sets of APIs for respective portals of corresponding SPs which are corresponding cloud service providers (CSPs), each of the received sets of APIs indicating mechanisms to deploy a service on the corresponding CSP, the mechanisms including at least one of deploying a virtual machine, configuring the virtual machine, deploying a network, configuring the network, deploying middleware, configuring the middleware, deploying the application, and configuring the application;
the computer system storing the sets of APIs in the CMDB; and
the computer system generating and storing rules in the CMDB, so that each rule indicates conditions under which a corresponding set of APIs is executed to deploy the service on the corresponding CSP,
wherein the step of generating the topology includes the step of generating and storing the rules, and
wherein the steps of disabling the first API and activating the second API are based on the rules stored in the CMDB.

17. The computer system of claim 14, wherein the method further comprises the steps of:
the computer system receiving sets of APIs for respective SPs which are cloud service providers (CSPs), each of the received sets of APIs indicating mechanisms to deploy a service on a corresponding CSP included in the CSPs;
the computer system generating and storing rules in the CMDB, so that each rule indicates conditions under which a corresponding set of APIs is executed to deploy the service on the corresponding CSP;
the computer system obtaining a subscription to a service that sends a notification of changes to the sets of APIs;
based on the subscription, the computer system receiving a notification of a change to a set of APIs specified by a rule stored in the CMDB; and
in response to the step of receiving the notification, the computer system updating the rule in the CMDB based on the change to the set of APIs.

18. The computer system of claim 14, wherein the method further comprises the steps of:
the computer system receiving first, second, and third information about the first service provided by the first SP which is a first cloud service provider (CSP), the second service provided by the second SP which is a second CSP, and the a third service provided by a third SP which is a third CSP, respectively, wherein the first, second, and third information includes geographic attributes of the first, second, and third CSPs, respectively;

the computer system determining that the second and third services provide the functionality of the application;

the computer system determining a threshold for a latency of the application;

based on the geographic attributes in the second information, the computer system determining that redeploying the application to the second CSP results in a first latency of the application;

based on the geographic attributes in the third information, the computer system determining that redeploying the application to the third CSP results in a second latency of the application;

the computer system determining that the first latency does not exceed the threshold and the second latency exceeds the threshold; and based on the second service providing the functionality of the application, the first latency not exceeding the threshold, and the second latency exceeding the threshold, the computer system redeploying the application to the second CSP and not to the third CSP.

19. The computer system of claim 14, wherein the step of detecting the fail condition includes detecting an outage of an entire data center provided by the first SP which is a first cloud service provider (CSP), the outage of the entire data center causing the outage of the first service.

\* \* \* \* \*